United States Patent [19]
Thompson

[11] 3,844,430
[45] Oct. 29, 1974

[54] WATER REACTING MEANS FACILITATING LOADING OF BOAT TRAILERS
[76] Inventor: Harold A. Thompson, Box 70, Lakeside, Oreg. 97449
[22] Filed: Dec. 13, 1973
[21] Appl. No.: 424,360

Related U.S. Application Data
[62] Division of Ser. No. 277,619, Aug. 3, 1972, Pat. No. 3,800,968.

[52] U.S. Cl. ...................... 214/500, 9/1 T, 61/1 R, 117/230, 214/84
[51] Int. Cl. ............................................. B60p 3/10
[58] Field of Search ............ 214/500, 505, 506, 84, 214/85.1, 85.5; 280/414 R; 9/1 T; 114/230, 43.5; 61/6, 1 R

[56] References Cited
UNITED STATES PATENTS
| | | | |
|---|---|---|---|
| 3,221,503 | 12/1965 | Wilson | 61/6 |
| 3,553,968 | 12/1968 | Armistead | 61/1 R |
| 3,603,465 | 9/1971 | King | 280/414 R |

*Primary Examiner*—Robert G. Sheridan
*Assistant Examiner*—Donald W. Underwood
*Attorney, Agent, or Firm*—James D. Givnan, Jr.

[57] ABSTRACT

Water reacting means in place on a small boat trailer generating a water flow rearwardly therefrom for alignment of a boat hull tethered to the trailer against the influence of a crosswind or crosscurrent which otherwise would misalign the boat to hamper boat launching and retrieving operations.

10 Claims, 8 Drawing Figures

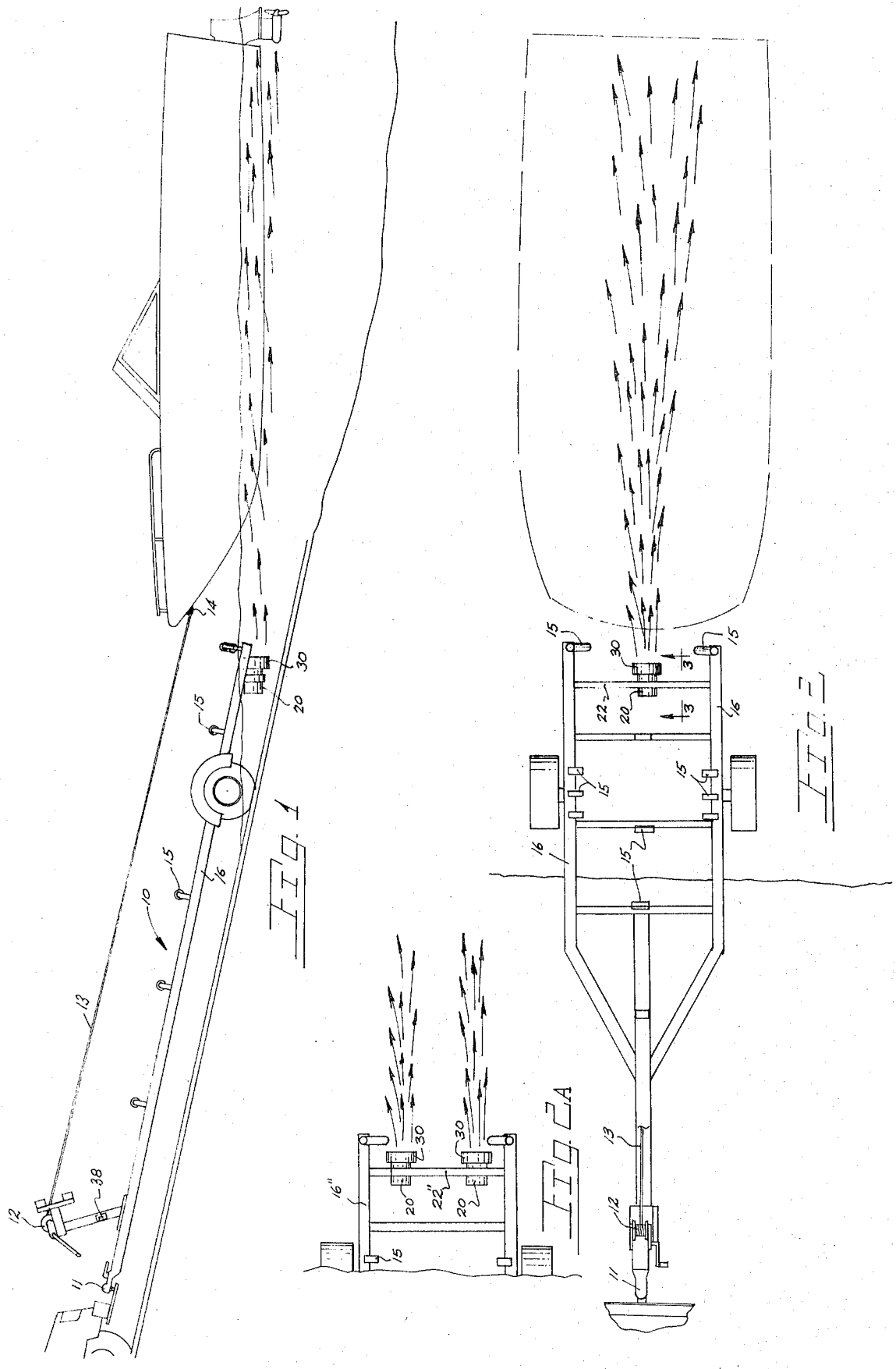

3,844,430

WATER REACTING MEANS FACILITATING LOADING OF BOAT TRAILERS

This is a division of application Ser. No. 277,619, filed Aug. 3, 1972, now U.S. Pat. No. 3,800,968.

BACKGROUND OF THE INVENTION

The present invention relates generally to boat trailers and more particularly to water reacting means in combination with a boat trailer from which the boat is launched and retrieved longitudinally of the inclined trailer frame. Such trailers are commonly used for outboard and stern drive powered boats normally ranging up to 20 feet or so in length.

A problem exists in the launching and retrieving of boats from a boat trailer which, during such operations, is normally located on a ramp extending into the water. Such trailers include either powered winches or manual winches depending on the size of the boat carried along with hull and keel supporting rollers which serve dually to guide and support the boat. A rope is entrained about a winch on the trailer and terminates oppositely in attachment with an eye on the boat prow.

Important to successful launching and retrieving operations is the matter of maintaining the centerlines of the boat and trailer in alignment. In a no wind, no current water condition, the alignment of same constitutes no problem. Most commonly, however, a boat launching or retrieving operation is conducted in the presence of either a water current or a crosswind condition either of which will displace the boat hull from the desired aligned relationship with the trailer. Not uncommonly the effect of such an assymmetrical force is to cause the boat hull and, more importantly, the keel thereof to miss or roll off the trailer's supporting rollers with resulting scarring of the hull and necessitating restarting of the operation. Further efforts to launch or retrieve the boat in such conditions may necessitate attaching a line adjacent the stern of the boat to hold the same against the misaligning influence of the current and/or crosswind. In such an event, the loading and unloading becomes a troublesome, time consuming task requiring the efforts of, at least, two or three people.

This problem has been recognized for some time with various attempts made to alleviate same. To the extent known, such attempts have not met with wide acceptance. Generally speaking, the solutions tried fall within two distinct categories; boat trailers with pivotable boat cradles enabling launching and retrieving to be more nearly aligned with the prevailing wind or current and mechanical guides affixed on the trailer to engage the gunwales of the boat to support the hull against assymmetrical forces. For one reason or another neither approach has been widely received and at present the majority of boat trailers manufactured and sold do not include means for maintaining trailer-boat alignment.

SUMMARY OF THE PRESENT INVENTION

The present invention concerns the combination of water reacting means and a boat trailer of the class described to assist in maintaining an aligned relationship between trailer and boat during launching and retrieving.

The invention comprehends the combination of water reacting means with a boat trailer for the purpose of generating a directional flow of water to act on the boat hull. One form of the invention includes a motor carried by the trailer and driving a propeller to direct a flow of water past the boat hull. The hull, tethered at its forward end, in response to the flow will streamline into alignment with the trailer and remain so until launching or loading is completed regardless of moderate crosswinds or water current. A winch carried rope is attached in the normal manner to the boat prow.

Depending upon hull configuration it may be desirable to provide multiple water currents passing along opposite sides of the hull centerline. To accomplish this the water reacting means may be mounted in a dual, spaced apart manner on the trailer. Further, it may be desirable to channel the water flow for the purpose of directionalizing the current produced. Additionally, adjustable mounting means are provided to enable the resulting water current to be varied relative to the trailer.

BRIEF DESCRIPTION OF THE DRAWINGS

In the accompanying drawings:

FIG. 1 is a side elevational view of a boat trailer and boat with water reacting means in place on the trailer, FIG. 2 is a plan view of the trailer shown in FIG. 1 with the boat shown in phantom lines for purposes of illustration, FIG. 2A is a view similar to FIG. 2 showing a dual installation.

DETAILED DESCRIPTION OF PREFERRED EMBODIMENTS

Figure 3:
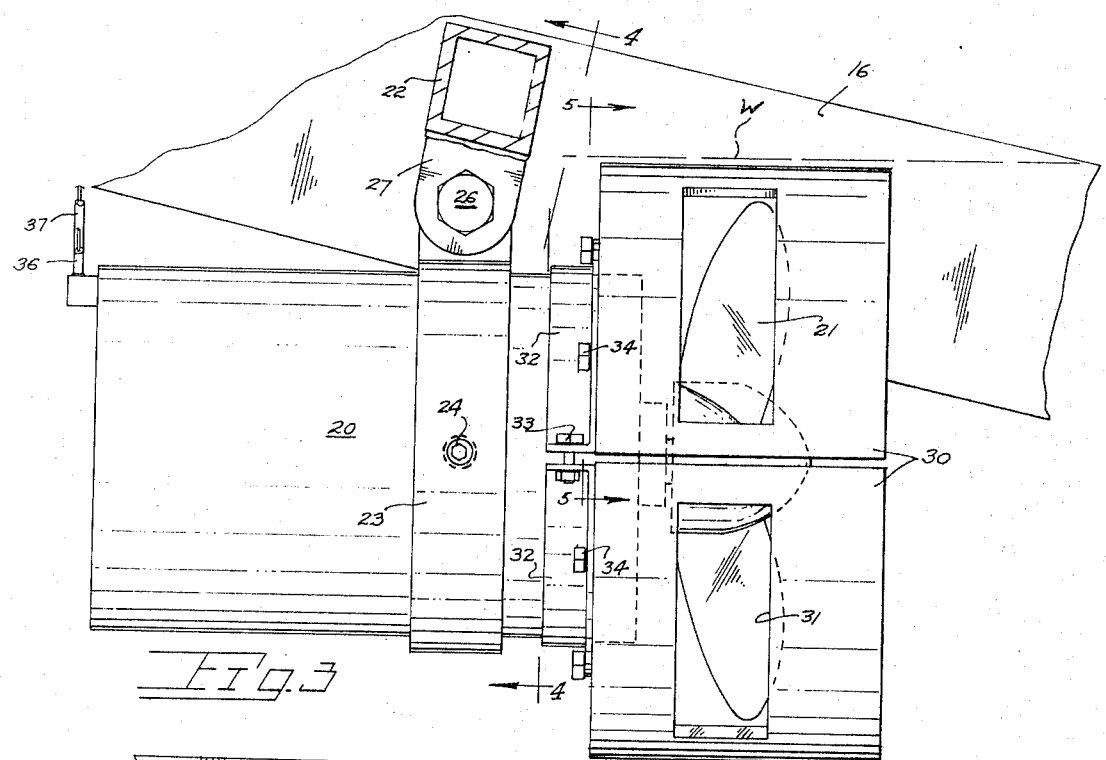
FIG. 3 is a side elevational view of one form of water reacting means taken along line 3 — 3 of FIG. 2.
Figure 4:
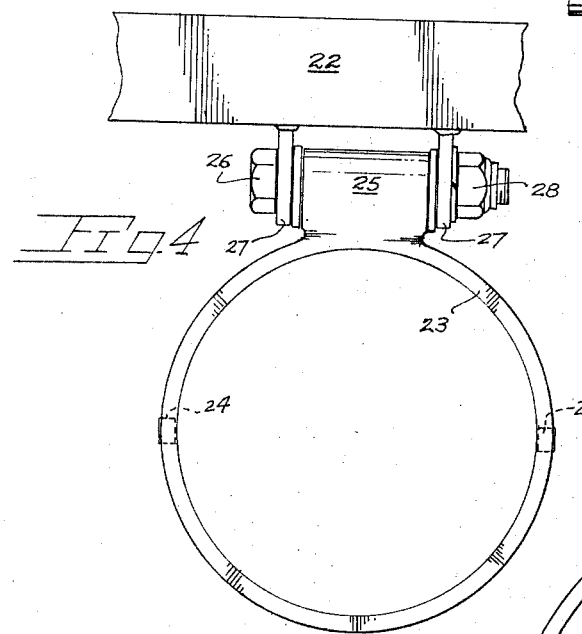
FIG. 4 is an elevational view of adjustable mounting means taken along line 4 — 4 of FIG. 3.

With continuing reference to the accompanying drawings wherein applied reference numerals indicate parts similarly identified in the following specification, the reference numeral 10 indicates generally a typical small boat trailer used for the transport of boats up to 20 feet or so in length. Typically such trailers are towed by passenger vehicles or small trucks by means of a trailer hitch 11. The launching and retrieving of the trailered boat is normally accomplished with the rear end of the trailer at least partially submerged. A winch at 12 may be manually or electrically powered with its rope or cable 13 attached to a prow mounted eye 14. The trailer 10 additionally includes a series of boat-supporting rollers 15, some of which support the boat keel while other rollers support laterally spaced areas of the hull. The foregoing is intended to describe a conventional small boat trailer used for the transport of both powered and unpowered boats launched and retrieved onto the trailer located adjacent the water's edge.

As earlier mentioned, the maintenance of trailer and boat alignment during loading and unloading is essential. In situations where no crosswind or crosscurrent is present such alignment constitutes no problem. In many instances, however, unloading and loading must be accomplished with a wind or water force acting on the boat causing same to slew into a canted position to one side or the other of a projected trailer centerline. In such cases lines must be attached to the boat to reposition and hold same against the wind or water current. The following described water reacting means obviates the use of such lines or boat centering devices.

Affixed to the rearward portion of the trailer 10 is one form of water reacting means comprising an electric motor means 20 powering a propeller 21. A crossmember 22 of the trailer extends intermediate the trailer frame members 16 and is provided adjacent its center with a pair of weldments 27 between which a motor mounting ring 23 is pivotally suspended. Ring 23 has an inside diameter corresponding to the housing of motor 20 to permit set screws at 24 to bear against the motor housing locking same within the ring. An enlargement 25 on the ring is apertured to receive a bolt member 26 which also extends through weldments 27. A self-locking nut 28 provides suitable locking means for ring 23. Accordingly the motor is mounted in a manner permitting it to be inclined in either direction from a horizontal plane about the axis of bolt 26 for the optimum generation of a water current rearwardly from the trailer.

Disposed about propeller 21 is a segmented housing structure 30 of cylindrical shape with arcuately extending openings 31 spaced thereabout. Housing 30 may be of two-piece construction with semi-circular halves being retained on the motor 20 by means of interconnecting clamps 32 bolted at 33. Other attachment means for the housing structure 30 may prove entirely suitable. The housing segments 30 and clamps 32 may be of cast construction with bolts 34 securing one to another.

Figure 5:
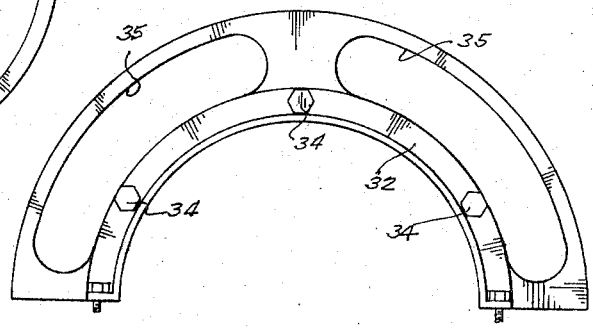
FIG. 5 is a view of a propeller housing taken approximately along line 5 — 5 of FIG. 3.

As viewed in FIG. 5 each half of the segmented housing defines inlet openings 35 which, in addition to the earlier mentioned arcuate openings 31, provide for an inlet flow of water to propeller 21 while adequately shielding the propeller. The segmented housing 30 projects rearwardly past the propeller to provide a shroud for the propeller which, in addition to the function of shielding the propeller, serves to circumferentially confine propeller discharge. Wires at 36–37 are in circuit with a power source such as the towing vehicles's battery via a switch 38 located adjacent winch 12.

Figure 6:
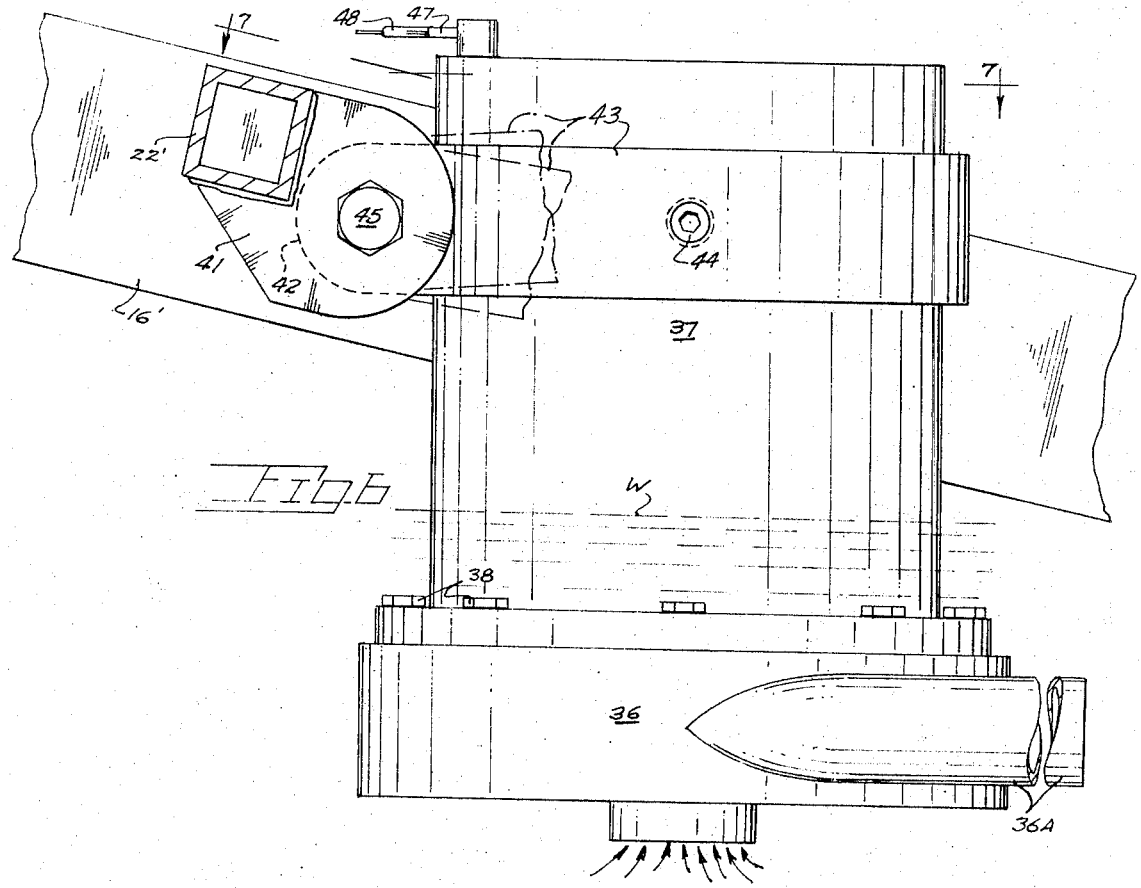
FIG. 6 is a view similar to FIG. 3 showing a second form of water reacting means embodied within a motor and pump arrangement.
Figure 7:
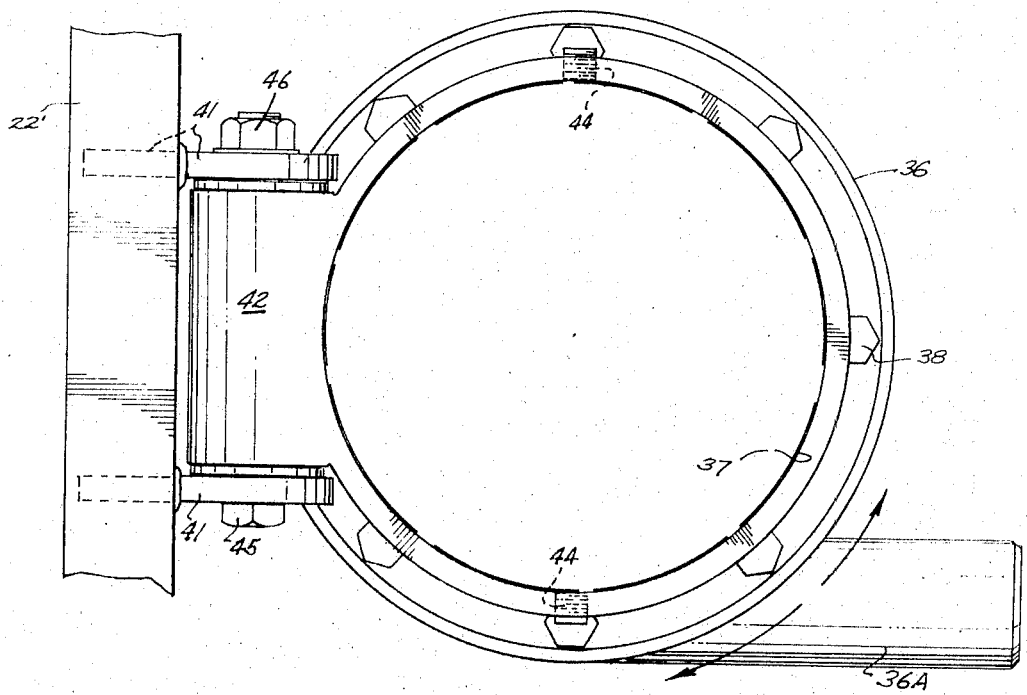
FIG. 7 is a plan view of FIG. 6 with the motor shown in phantom lines.

With attention to FIGS. 6 and 7, a second form of water reacting means is disclosed in the form of a pump 36 which is shown as being of the centrifugal type having a tangential outlet 36A. An electric motor 37 is in driving engagement with the pump, the motor housing being joined to the pump housing by fasteners 38. In similarity to the first described form of the invention, a crossmember 22' is secured intermediate trailer frame members 16' and carries a pair of weldments 41. Disposed between the weldments 41 is an enlargement 42 integral with a motor mounting ring 43. As was the case earlier, the motor mounting ring 43 has an inside diameter corresponding to the external diameter of the housing of motor 37 to permit a close fit therebetween. Loosening of set screws 44 permits both vertical and rotational adjustment of the motor and pump as indicated by applied arrows to best suit the trailer-boat combination. Further, adjustment of the pump discharge is achieved by loosening bolt member 45 and locking nut 46 to allow positioning movement of the motor and pump about the axis of bolt 45 as viewed in broken and dashed lines of FIG. 6. Electrical conduits 47–48 serving the motor 37 are in circuit with a source of electrical power via a switch located adjacent the winch 12 facilitating simultaneous operator control of the motor and winch during a loading or unloading operation.

In one embodiment of the invention the electric motor may be of the type including an internal reduction drive to reduce the rotational speed of the motor output shaft and hence the R.P.M. of propeller 21.

In operation the water reacting means generates an artificial water current flowing rearwardly from the trailer along or parallel to a projected trailer centerline. A boat hull tethered by the winch rope 13 and within the current flow will streamline or orientate itself into alignment with the flow regardless of crosswind or crosscurrent conditions. Obviously, the boat profile, the wind and water conditions will determine to what degree the water reacting means will be effective to overcome adverse conditions. Further, in some instances it may be necessary to initially locate the boat in the water current flow by restricting lateral movement of the winch line 13 adjacent the prow of the boat. In FIG. 2A a water flow is produced by a pair of water reacting means in place on a trailer crossmember 22" extending intermediate the trailer frame members 16.

While I have shown and described but a few embodiments of the invention it will be apparent to those skilled in the art that the invention may be embodied still otherwise without departing from the spirit and scope of the invention.

Having thus described the invention what is desired to be secured under a Letters Patent is:

1. In combination,
a boat trailer of the type partially submerged during boat launching and retrieval operations, a winch having an entrained rope attached to the boat prow tethering same prior to winching of the boat onto the trailer,
motor means carried by said trailer,
a propeller powered by said motor means and producing an artificial water current rearwardly from the trailer whereby the tethered boat is urged by the water current toward alignment with the trailer centerline to facilitate loading of the boat.

2. The combination claimed in claim 1 wherein said motor means comprises an electric motor with said propeller being mounted on the motor output shaft, said combination further includes means adjustably mounting said motor to the trailer to permit adjustment of the motor relative to the trailer for varying the direction of the artificial water current relative to said trailer.

3. The combination claimed in claim 2 additionally including a protective housing structure carried by said motor and disposed about said propeller.

4. The combination claimed in claim 3 wherein said housing is of circular shape and defines openings therein permitting the inward entry of water in a radial direction.

5. The combination claimed in claim 4 wherein said housing extends rearwardly past said propeller thereby circumferentially confining propeller discharge.

6. The combination as claimed in claim 1 wherein said motor means comprises multiple electric motors each oppositely offset from the trailer centerline whereby the propeller powered by each of said electric motors produce multiple artificial water currents.

7. The combination as claimed in claim 6 wherein said combination further includes means adjustably mounting each of said motors to the trailer to permit adjustment of the motor position relative to the trailer.

8. The combination claimed in claim 7 additionally including a protective housing structure carried by each of said motors and disposed about each propeller.

9. The combination claimed in claim 8 wherein each housing is of circular shape and defines openings therein permitting the inward entry of water in a radial direction.

10. The combination claimed in claim 9 wherein each housing extends rearwardly past said propeller thereby circumferentially confining the propeller discharge.

* * * * *